United States Patent

Batra

(10) Patent No.: US 9,525,712 B1
(45) Date of Patent: Dec. 20, 2016

(54) DYNAMIC AUTO-REGISTRATION AND TRANSCODING OF MEDIA CONTENT DEVICES VIA NETWORK ATTACHED STORAGE

(75) Inventor: Rajesh K. Batra, Los Altos, CA (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 1081 days.

(21) Appl. No.: 12/847,096

(22) Filed: Jul. 30, 2010

(51) Int. Cl.
*G06F 15/16* (2006.01)
*H04L 29/06* (2006.01)

(52) U.S. Cl.
CPC ............. *H04L 65/60* (2013.01); *H04L 65/602* (2013.01); *H04L 65/604* (2013.01)

(58) Field of Classification Search
CPC ................. H04N 21/44029; H04N 21/4184; H04N 21/440218; H04N 21/4622; H04N 21/47202; G06Q 30/0267; H04L 49/901; H04L 51/066; H04L 65/4092; H04L 65/60; H04L 65/602; H04L 65/604
USPC ....................................................... 709/203
See application file for complete search history.

(56) References Cited

U.S. PATENT DOCUMENTS

| | | | |
|---|---|---|---|
| 7,191,212 B2 * | 3/2007 | Hirai | 709/203 |
| 2004/0177373 A1 * | 9/2004 | Kawabe et al. | 725/62 |
| 2004/0213273 A1 | 10/2004 | Ma | |
| 2006/0069797 A1 * | 3/2006 | Abdo et al. | 709/231 |
| 2006/0195884 A1 * | 8/2006 | van Zoest et al. | 725/134 |
| 2006/0245490 A1 * | 11/2006 | Yoshizawa et al. | 375/240.01 |
| 2006/0253894 A1 | 11/2006 | Bookman et al. | |
| 2007/0162487 A1 * | 7/2007 | Frailey | 707/102 |
| 2008/0065691 A1 | 3/2008 | Suitts et al. | |
| 2008/0133546 A1 * | 6/2008 | Phillips | 707/10 |
| 2008/0181578 A1 * | 7/2008 | Hanes | H04N 21/4334 386/232 |
| 2009/0119322 A1 | 5/2009 | Mills et al. | |
| 2009/0286560 A1 | 11/2009 | Willis | |
| 2010/0011014 A1 | 1/2010 | Odulinski et al. | |
| 2011/0106910 A1 * | 5/2011 | Grasset | 709/217 |

* cited by examiner

*Primary Examiner* — Djenane Bayard

(57) ABSTRACT

A method and system for providing media to a client device by a network attached storage unit is provided. A connection is established between the client device and the network attached storage unit, a media format for the client device is selected based upon a negotiation involving the client device and the network attached storage unit.

44 Claims, 5 Drawing Sheets

DYNAMIC AUTO-REGISTRATION AND TRANSCODING OF MEDIA CONTENT DEVICES VIA NETWORK ATTACHED STORAGE

FIELD OF THE INVENTION

This invention relates to systems and methods for delivery of stored media content to client devices in selected media formats, and more particularly to a system and method wherein a network attached storage device automatically negotiates media formats for delivery of media to client devices.

BACKGROUND OF THE INVENTION

Mobile telephones, personal digital assistants (PDAs), portable media players, personal video cameras network-enabled devices are increasing in number and popularity. Many of the users of these client devices wish to download media content from network attached storage (NAS) devices to whichever device they have available at the time. The heterogeneous nature of the various types of client devices and preferences typically require different media formats for such content. For example, depending on the available memory or audio/visual resolution capability of devices, different formats for audio and video (H.264, MPEG-1, MPEG-4, JPEG, etc.) content may be necessary, with each device supporting a specific format or set of formats. NAS-stored content may not be in a desired format for a particular device, and thus data sent to the client devices is transcoded from stored form into the desired formats. In most instances users manually negotiate media format selection from a NAS, with the user of the client device inputting media format selection and transcoding information via graphical or command line interface on the client device, and the NAS processing the media format selection instructions.

As the number of client devices seeking downloadable media content increases in a shared network environment, each NAS communicating with the devices must commit an increasing amount of processor and memory resources to handling media format selection requests from the client devices. The increasing volume of requests slows down and otherwise interferes with file storage and retrieval operations that the NAS performs. This problem can be partly alleviated using conventional load balancing and content management provided by independent servers. However, negotiating manual selection of desired media formats by increasing numbers of client devices is not a scalable operation and can potentially become intractable. There is accordingly a need for a NAS system and method that allows faster and easier selection of media formats for delivery of media content to client devices. The invention disclosed herein satisfies this need, as well as others.

SUMMARY OF THE INVENTION

In one aspect, the present invention provides a method for providing media to a client device by a network attached storage unit, the method comprising: establishing a connection between the client device and the network attached storage unit; and selecting a media format for the client device, based upon a negotiation involving the client device and the network attached storage unit. In at least one embodiment, the method may further comprise delivering media content to the client device in the selected format according to a media content request from the client device.

In at least one embodiment, the negotiation comprises the client device requesting a format supported by the network attached storage unit. In at least one embodiment, the negotiation comprises the client device identifying itself to the network attached storage unit, and the network attached storage unit provides the selected format as a format best matching a format used by the client device.

In at least one embodiment, the negotiation comprises the client device identifying preferred formats to the network attached storage unit and the network attached storage unit provides the selected format as a format best matching one of said preferred formats. In at least one embodiment, the negotiation comprises the network attached storage unit generating and making available to the client device a list of supported formats, and the client device selects the selected format form the list without user intervention.

In at least one embodiment, the negotiation comprises registering the client device with the network attached storage unit and the selected format is selected based on information registered during the registering of the client device. In at least one embodiment, the negotiation comprises the client device selecting the selected format from a fixed set of formats listed by the network attached storage unit. In at least one embodiment, the negotiation comprises the network attached storage unit selecting the selected format from a fixed set of formats listed by the client device.

In at least one embodiment, the method may further comprise transcoding stored media content into the selected media format. In at least one embodiment, the transcoding is performed dynamically and transcoded media in the selected format is streamed to the client device in real time while performing the transcoding. In at least one embodiment, the transcoding is performed in the background for later transfer to the client device. In at least one embodiment, the transcoding comprises pre-transcoding carried out in the background without requirement of a specific request from a user of the client device.

In at least one embodiment, the method may further comprise confirming the selected media format with a user of the client device. In at least one embodiment, the method may further comprise requesting a media format selection from the user of the client device. In at least one embodiment, the method may further comprise updating a selected media format according to the identity of the client device. In at least one embodiment, the method may further comprise retrieving requested media content from stored media content. In at least one embodiment, the selection of a media format and the negotiation comprise selecting a media format by the network attached storage unit based on the type of client device making a media content request. In at least one embodiment, the selecting a media format and the negotiation comprise selecting a media format by the network attached storage unit based on the type of media content requested by the client device.

In at least one embodiment, the method may further comprise authenticating the client device.

In another aspect, the present invention provides a network attached storage system comprising: data storage containing stored media content; a processor; and memory containing stored programming, the stored programming configured to be run by the processor to: establish a connection between a client device and the network attached storage system; and select a media format for the client device, based on a negotiation involving the client device and the network attached storage system.

In at least one embodiment, the network attached storage system may further comprise programming configured to be run by the processor to deliver media content to the client device in the selected format. In at least one embodiment, the network attached storage system may further comprise programming configured to be run by the processor to transcode stored media content into the selected format. In at least one embodiment, the network attached storage system may further comprise programming configured to be run by the processor to perform the transcoding of the stored media content dynamically and to stream media content having been transcoded to the client device in real time while performing the transcoding.

In at least one embodiment, the network attached storage system may further comprise programming configured to be run by the processor to perform the transcoding of the stored media content in the background for later transfer to the client device. In at least one embodiment, the network attached storage system may further comprise programming configured to be run by the processor to perform the transcoding of the stored media by pre-transcoding carried out in the background without requirement of a specific request from a user of the client device.

In at least one embodiment, the network attached storage system may further comprise programming configured to be run by the processor to confirm the selected media format with a user of the client device.

In at least one embodiment, the negotiation comprises the client device requesting a format supported by the network attached storage system. In at least one embodiment, the negotiation comprises the client device identifying itself and preferred formats to the network attached storage system, and the network attached storage system provides the selected format as a format best matching one of the preferred formats. In at least one embodiment, the negotiation comprises the network attached storage system generating and making available to the client device a list of supported formats, and the client device selects the selected format form the list without user intervention.

In at least one embodiment, the negotiation comprises registering the client device with the network attached storage system and the selected format is selected based on information registered during the registering of the client device. In at least one embodiment, the negotiation comprises the client device selecting the selected format from a fixed set of formats listed by the network attached storage system. In at least one embodiment, the negotiation comprises the network attached storage system selecting the selected format from a fixed set of formats listed by the client device.

In at least one embodiment, the network attached storage system may further comprise programming configured to be run by the processor to request a media format selection from the user of the client device. In at least one embodiment, the network attached storage system may further comprise programming configured to be run by the processor to update a selected media format according to the identity of the client device.

In at least one embodiment, the network attached storage system may further comprise programming configured to be run by the processor to retrieve requested media content from stored media content. In at least one embodiment, the network attached storage system may further comprise programming configured to be run by the processor to select a media format based on the type of client device making a media content request. In at least one embodiment, the network attached storage system may further comprise programming configured to be run by the processor to select a media format based on the type of media content requested by the client device.

In another aspect of the present invention, a method of providing media to a client device includes: establishing a connection with a client device over a network; and automatically, without user intervention, selecting a media format for said client device.

In another aspect of the present invention, a method of receiving a media file from a network attached storage unit includes: establishing a connection with the network attached storage unit; requesting a media file; negotiating with said network attached storage unit, without user intervention, for a selected media format; selecting said selected media format, without user intervention; and receiving said medial file in said selected media format. These and other features of the invention will become apparent to those persons skilled in the art upon reading the details of the systems and methods as more fully described below.

DETAILED DESCRIPTION

Before the present systems and methods are described, it is to be understood that this disclosure is not limited to particular embodiments described, and, as such, embodiments may vary from those specifically described herein. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described.

It must be noted that as used herein and in the appended claims, the singular forms "a," "an," and "the" include plural referents unless the context clearly dictates otherwise. Thus, for example, reference to "a client device" includes a plurality of such client devices and reference to "the format"

includes reference to one or more formats and equivalents thereof known to those skilled in the art, and so forth.

The invention provides efficient systems and methods for delivering stored media content in network attached storage to client user devices wherein media formats for the client devices are automatically selected or determined without requiring user input for format selection each time a client device addresses the NAS. The automatic media format selection provided by the invention allows accommodation of large numbers of client device requests without negotiation of manual format selection by clients for each device request.

Figure 1:
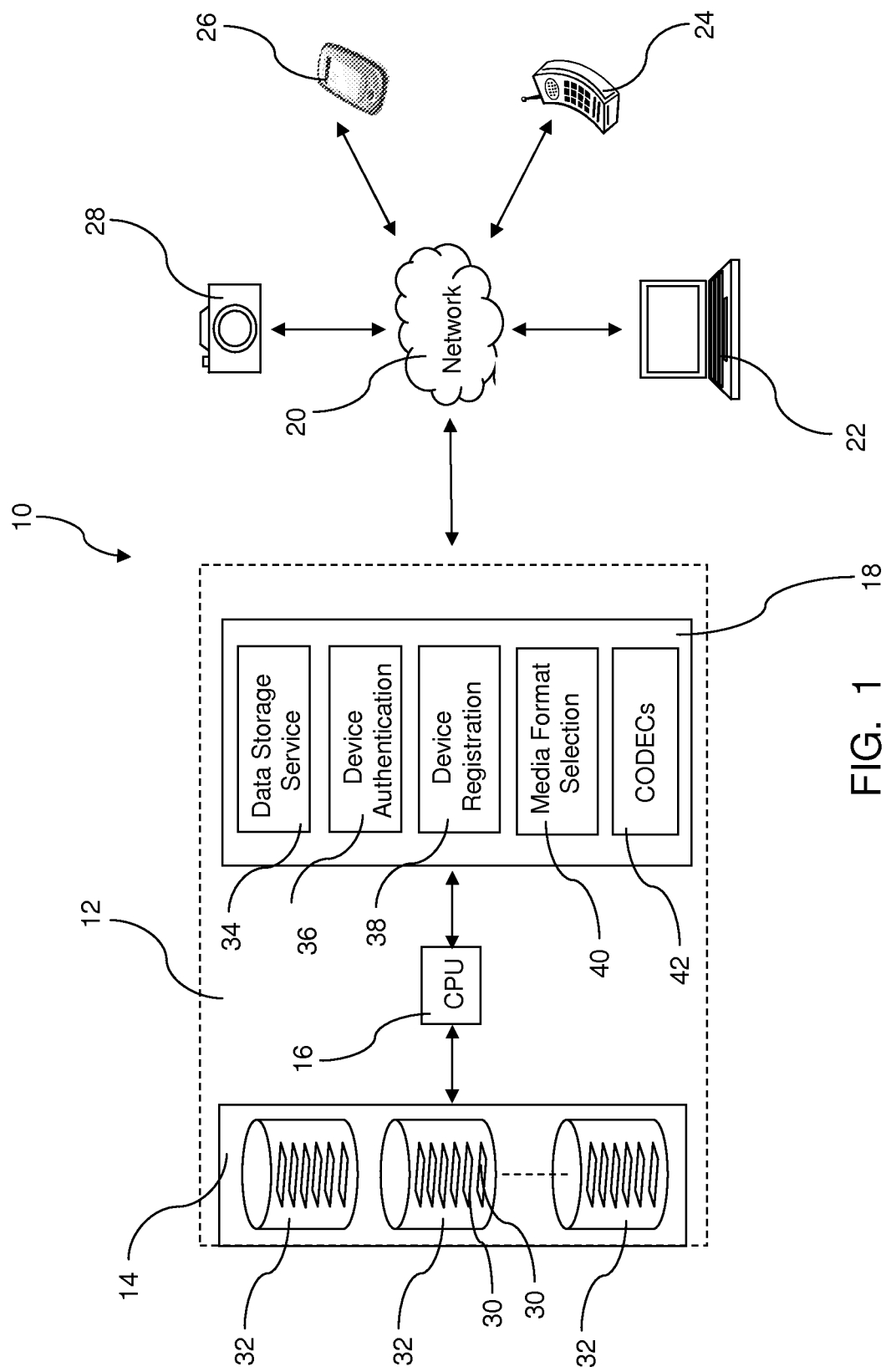
FIG. 1 is a functional block diagram illustrating a network storage device and system in accordance with an embodiment of the present invention.

Referring now to FIG. 1, a network attached storage system 10 in accordance with an embodiment of the present invention is shown. System 10 includes a network attached storage (NAS) device 12 having a data storage element 14, memory element 18, and a processor or CPU element 16. Data storage 14, CPU 16 and memory 18 are operatively coupled to each other via conventional communication interface elements (not shown) such that CPU 16 may process or otherwise handle data storage and retrieval instructions from programming stored in memory 18 as well as other operations of NAS 12. In some embodiments, NAS 12 may include user input/output (I/O) elements and additional memory elements (not shown). In order to maximize resources available for file serving operations, such I/O devices may be minimized or omitted. NAS 12 may utilize a NAS-oriented operating system such as FREENAS®, an embedded open source NAS distribution based on FREEBSD® (an operating system for modern server, desktop, and embedded computer platforms) which supports file based data storage services and multiple protocols.

NAS 12 is operatively coupled to a computer network 20 via a conventional network port or ports (not shown) such that NAS 12 may communicate with remote client devices via network 20. Network 20 in many embodiments may comprise the World Wide Web.

Network 20 may alternatively comprise a local area network, a wide area network, or combinations thereof, and communication between network 20 and NAS 12 may be via wireless interface, wired interface, or both. NAS 12 may handle a client request from network 20 using one or more protocols such as CIFS, FTP, NFS, TFTP, AFP, RSYNC, Unison, iSCSI and UPnP. The protocol(s) may utilize a simple command set configured to capture the programming operations described herein. In many embodiments NAS 12 will support multiple protocols commonly used by network enabled devices.

Client devices—examples of which are shown in FIG. 1 as a laptop computer 22, mobile telephone 24, personal digital assistant or media player 26, and web-enabled camera 28—are configured to operatively couple to network 20. The particular devices 22-28 shown in FIG. 1 are only illustrative, and a larger number of devices and types of devices may access network 20 in the manner shown in FIG. 1. Devices 22-28 include data storage, processing and network accessing capability such that, when coupled to network 20, devices 22-28 may access and download stored media from NAS 12 and/or upload media files to NAS 12. Devices 22-28 are heterogeneous in nature and configuration, and each individual device 22-28 may support one or more native media formats. Laptop 22, for example may have greater memory storage, processing power and display resolution than mobile phone 24 and be able to handle media files in a greater number of formats than portable media player 26.

The data storage 14 of NAS 12 includes one or more storage drives 30, and, as shown in the embodiment of FIG. 1, may be arranged in redundant storage containers or RAID (redundant arrays of independent disks) 32. Storage drives 30 may include hard disk drives; solid state drives; other recordable optical, magnetic, or electronic media; combinations of the same; and the like. Storage containers 32 contain stored media content that may be retrieved and updated according to instructions from memory 18 and processor 16. The stored media content may include, for example, audio, video, still images, voice, text, or other form of media. The stored media content in containers 22 may be in a single uncompressed container format for each media type. For example, audio files may be archived in data storage 14 as PCM (pulse code modulation) format, .wav or .aiff files, or as BWF (broadcasting wave format). Still images may be stored in FITS (Flexible Image Transport System) or TIFF (Tagged Image File Format). Video may be stored in AVI, ANIM, ASF, DVR-MS, IFF, MOV, MPEG-1, MPEG-2, MP4 or the like. Other media file types and corresponding storage or container formats are possible and will suggest themselves to those skilled in the art upon review of this disclosure.

In some embodiments, as in FIG. 1, CPU 16 executes programming stored in memory 18 for NAS 12 and carries out conventional fetch, decode, and writeback operations. Various processors based on AMD and Intel processor designs (or other processor designers) may be used as CPU 16. CPU 16 is capable of simultaneously handling operations associated with media format requests from multiple client devices using the programming described herein.

Memory 18 may comprise one or more conventional RAM components and/or ROM components (not shown) capable of storing programming configured to carry out operations performed by NAS 12 in accordance with embodiments of the invention. Operations carried out by memory 18 may include: establishing network connections with client devices; authenticating client devices; retrieving requested media content from data storage 14; storing and updating media format selections for individual client devices, negotiating or selecting media formats for client devices upon receiving client device requests for media content; transcoding media content from data storage 14 into selected media formats; and delivering requested media content to client devices in the selected media formats. In this regard memory 18 includes a file-based data storage service element 34, a device authentication element 36, a device registration element 38, a media format selection or determination element 40, and one or more CODEC (coder-decoder) elements 42 that are structured and configured to provide the programming described herein.

Data storage service programming 34 provides basic file level computer data storage services. Data storage service 34 establishes network connections with external client devices 22-28, retrieves media content requested by client devices 22-28, and delivers transcoded media content to client devices 22-28. Data storage service 34 may also receive and store uploaded media content from devices 22-28.

In some embodiments, device authentication programming 36 is configured to allow NAS 12 to determine credentials of client devices 22-28 seeking access to stored media information. Many authentication systems or methods may be utilized for device authentication 34 in accordance with the invention, including basic access authentication for HTTP transactions wherein client devices provide a user-name and password, cryptography-based HTTP digest access authentication, secure remote password protocol (SRP), public key encryption, Kerberos symmetric key encryption, and the like. Upon establishing a network connection between a client device and NAS 12 and prior to processing client device requests for downloading stored media content, device authentication 36 verifies the credentials of the client device.

Device registration programming 38 is stored on memory and is configured to be run by CPU 16 to register known client devices 22-28 by assigning or identifying a particular media format or formats to each client device or client device type (such as, for example, BLACKBERRY® smartphone, Apple IPHONE®, PC computer, Apple computer, internet television, and/or the like). A particular media format or formats are thus associated with the identity of an individual client device 22-28 or client device type. Information for assigning selected media formats to individual devices may be based on recognition of device type during device authentication or upon recognition of device or device type during device registration, with a device identifier, device type identifier, or other code used during authentication or registration being associated with a selected media format. Media format information for individual devices may also be obtained via subscription service wherein client users inform the subscription service of media format selections, which are then provided to device registration 38 by the subscription service.

Execution of device registration 38 by CPU 16 may utilize a look-up table or tables wherein are stored a plurality of pre-determined or pre-selected media formats that are associated with or assigned to identifiers or identity codes for a corresponding plurality of client devices and/or device types. Thus, for example, device registration 38 may assign portable media player 26 with MPEG-1 as a media format, while laptop 22 may be registered such that device registration 38 identifies MPEG-4 as a media format for laptop 22. Device registration 38 may associate multiple formats with an individual client device, with (for example) AVS as a video format and ALAC as an audio format assigned to a particular client device.

Device registration 38 is configured to expand and update the stored media format information for client devices. Thus, as the number of client devices 22-28 accessing NAS 12 increases, media format selections for additional devices may be added by device registration 38. If a user of a particular device wants to change a previously selected format, device registration 38 can change or update the selected format for that particular device.

Media format selection programming 40 is stored on memory configured to be run by CPU 16 to select an appropriate media format according to device format assignments by device registration 38, and request or otherwise arrange for transcoding of stored media into the selected format by CODECs 42. Transcoding requests by media format selection 40 may be carried out in real time for immediate delivery (e.g., streaming) of transcoded media in the desired format to client devices 22-28, or media format selection 40 may arrange for data transcoding in the background, for delivery of transcoded media in the desired format to client devices 22-28 at a later time.

Further, pre-transcoding may be carried out in the background without requirement of a specific request from a user of a client device. For example, after a client device has been registered by device registration 38, if delivery of one or more media files in the preferred format cannot be delivered immediately, then at some times that CPU 16 has available processing capacity over and above its current processing requirements, pre-transcoding of the media files or files is processed in the background. This enables the NAS system 10 to be a lower power system and still be capable of performing delivery of media files in the various preferred formats requested.

In some embodiments, the pre-transcoding may occur automatically for all media files of the NAS once the client device has been registered by device registration 38, regardless of whether the user of the client device has made any specific requests for file downloads or uploads. In this way, pre-transcoding can greatly reduce the time to have a later-requested file in the preferred file format in the event that the user does want to download or upload such file.

Alternatively, there may be memory limitations or other restrictions, filters or rules as to which media files are pre-transcoded upon registration of a client device with NAS 12. For example, only those media files having a starting size less than a predetermined number of bytes may be automatically pre-transcoded, while any larger file would require a user request for transcoding. As another example, only a predetermined or dynamically set number of files may be pre-transcoded; in another embodiment, the NAS 12 may have a maximum amount of memory allocated to transcoded files. In such embodiments, the NAS 12 may select from among possible files for transcoding, such as by starting with files having the most recent store date, those rated by popularity, those most downloaded, those having particular file types, combinations of the same, and the like.

In some embodiments, automatic pre-transcoding and/or automatic transcoding may be limited by user preferences selected during an initial device registration of a client device. For example, the user may set preferences that only audio files are to be transcoded/pre-transcoded for downloading and/or uploading to an Apple IPOD TOUCH® or web-enabled MP3 player. Likewise, a user may set preferences for pre-transcoding and/or transcoding only video files for downloading and/or uploading from a digital video recorder.

In some embodiments, automatic pre-transcoding and/or automatic transcoding may be limited by device type. For example, upon device registration 38, NAS 12, upon recognition of a WDPhotos application (commercially available from Western Digital Technologies, Inc., the assignee of the present application) may limit automatic pre-transcoding and/or automatic transcoding to still photo files only, and may automatically transcode/pre-transcode to a particular format resolution (e.g., 480×320 pixels) based on the device type.

The foregoing are only examples, as there are a plethora of different settings, filters, rules, etc. that can be used to tailor the number, type, size and/or other characteristics of files to be automatically transcoded/pre-transcoded by NAS 12 for a particular client device or for a device type. In each case, the tailoring helps optimize (reduce) storage space requirements and optimize CPU 16 usage.

In certain instances client devices 22-28 may request media content in a container format used by data storage 14, and thus transcoding would not be required. This situation may occur for example with client devices 22-28 having large memory capacity and/or high display resolutions and which can support raw, uncompressed media content.

Media format selection 40 may also be configured to provide requests to client devices 22-28 to select a media format when no media format assignment is found in device registration 38, and to update device registration 38 with the format selections. These selections may be based on automatic negotiation between the client devices 22-28 and NAS 12 or made with interactions between the users of client devices 22-28 and the devices 22-28 and NAS 12. The request to a client device 22-28 may be visually presented to the user of the device as a list of possible media formats and an invitation to select one or more of the displayed media formats. The media formats available for selection may include, for example, formats corresponding to each of the CODECs 42 available from NAS 12 as well as the container formats of data storage 14. Upon selection of a format or formats by the user, device registration 38 can modify or update the lookup table with the media format selection information provided by the device user. The selected media format information is then available for use in future requests by the client device 22-28.

Media format selection 40 may further be configured to confirm media format selections with the users of client devices 22-28 prior to transcoding media content or delivering media content to client devices 22-28. The confirmation may involve a message displayed to the user of a client device 22-28 requesting confirmation of a selected media format. In the event that the user of client device 22-28 does not confirm the selected format, the user may be invited (via invitation displayed on device 22-28) to provide another media format selection. The newly made format selection is then updated by device registration 38.

Media format 40 selection may still further be capable of making a media format selection for client devices 22-28 based on other criteria. For example, when an authenticated client device has no media format information assigned to it by device registration 38, and where no media format selection can be made by client device 22-28, media format selection 40 may choose a media format for the client device 22-28 based on any type of device recognition by NAS 12. The selection may be made based on the most likely media format to be supported by the particular type of device. Alternatively the media format choice may be based on the most common or popular media format for the media content requested by client device 22-28. Further alternatively, the media format choice may be made by selecting a format that most closely matches the most likely media format to be supported by the particular type of device, or the most common or popular media format for the media content requested by the client device 22-28. Still further, where different resolutions are transcoded, the resolution of the media format chosen may be that which is closest to the resolution requested by the client device, the resolution most likely to be supported by the particular type of device, or the most common or popular resolution.

Preferably media format selection is performed automatically, without user intervention. FIG. 2A is a flow chart illustrating events that may be carried out in an auto-negotiation process according to an embodiment of the present invention. In event 50, a connection is established between client device 22-28 and NAS 12 via network 20. Network connection may be established in a conventional manner according to HTTP or other network protocol connection request from client device 22-28. Upon establishing a network connection to NAS 12, client device 22-28 presents a request to NAS 12 for delivery of particular media content in data storage 14 to client device 22-28. The requested media content may be, for example, a song or collection of music, a video selection, a still picture, or the like.

Optionally, in event 52, an authentication determination may be made by device authentication 36 for the client device 22-28 connected in event 50.

In event 622, the device 22-28 can request supported formats for the media file to be downloaded. In event 622, NAS 12 generates a list of formats supported by NAS 12 and provides them to the device 22-28. In event 626, the client device 22-28 selects a format from the list that best matches a format supported by the client device. For example, if a phone using the ANDROID™ (Google, Inc., Mountain View, Calif.) operating system has a screen that displays resolution of 854×480, then a best match may be a format that has a resolution equal to, or closest to 854×480. Once a format has been selected, the requested filed can be transcoded, if it is not already in the selected format and transferred to the device 22-28, or, if the requested file is already stored in NAS 12 in the selected format, the media file can be transferred without the need for transcoding. This handshake between NAS 12 and the client device 22-28 in performing the auto-negotiation can occur without user intervention, thereby providing an optimized experience to the user without encumbering the user by requiring the user to make a selection, as the selection is made by negotiation between NAS 12 and the device 22-28 to best match the hardware of the device 22-28.

Figure 2B:
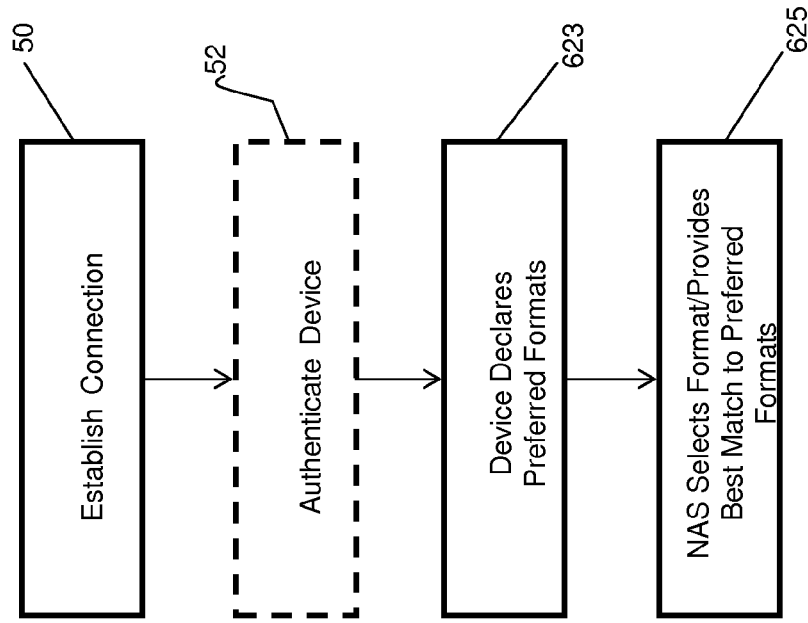
FIG. 2B is a flow chart illustrating events that may be carried out in an auto-negotiation process according to another embodiment of the present invention.
Figure 2A:
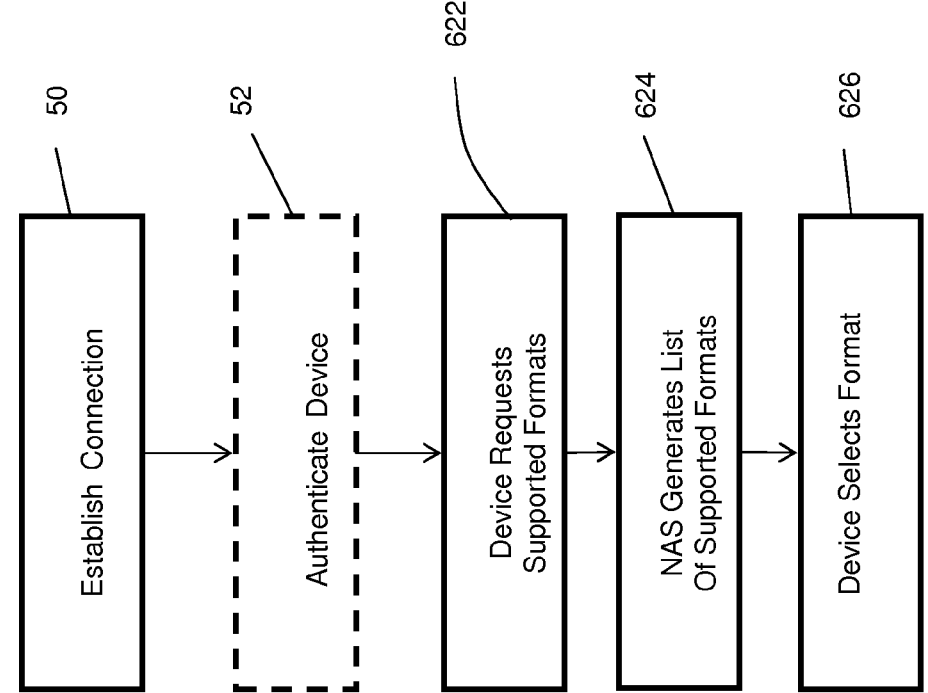
FIG. 2A is a flow chart illustrating events that may be carried out in an auto-negotiation process according to an embodiment of the present invention.

FIG. 2B is a flow chart illustrating events that may be carried out in an auto-negotiation process according to another embodiment of the present invention. In event 50, a connection is established between client device 22-28 and NAS 12 via network 20. Network connection may be established in a conventional manner according to HTTP or other network protocol connection request from client device 22-28. Upon establishing a network connection to NAS 12, client device 22-28 presents a request to NAS 12 for delivery of particular media content in data storage 14 to client device 22-28. The requested media content may be, for example, a song or musical or collection of music, a video selection, a still picture, or the like.

Optionally, in event 52, an authentication determination may be made by device authentication 36 for the client device 22-28 connected in event 52.

In event 623, the client device 22-28 declares preferred formats of the media file requested. In event 625, NAS 12 selects a format for delivery of the requested media file by providing a best match to the preferred formats declared. This handshake between NAS 12 and the client device 22-28 can occur without user intervention, thereby providing an optimized experience to the user without encumbering the user by requiring the user to make a selection, as the selection is made by negotiation between NAS 12 and the device 22-28 to best match the hardware of the device 22-28.

CODECs or transcoders 42 are stored in memory and configured to be run by CPU 16 to transcode media content in container format from data storage 14 into selected media formats as for client devices 22-28 determined by format selection 40. CODECs 42 in many embodiments are capable of providing transcoding into all common or popular media formats that are supported by client devices 22-28. Thus it is contemplated that CODECs 42 are configured to be executed to provide transcoding into multiple compressed and uncompressed formats, both lossy and lossless. Exemplary audio media CODECs include, MPEG-1 audio, MPEG-2 audio, MPEG-4 audio, MPEG-4 audio lossless coding, Apple lossless audio CODEC (ALAC), direct stream transfer (DST), free lossless audio CODEC (FLAC), Windows media audio (WLA) and the like. Exemplary video media CODECs include MPEG-1 video, MPEG-4 AVC, audio video standard (AVS), OpenAVS, and the like. CODECs 42 may also include speech (voice), text and other forms of CODEC.

Figure 3:
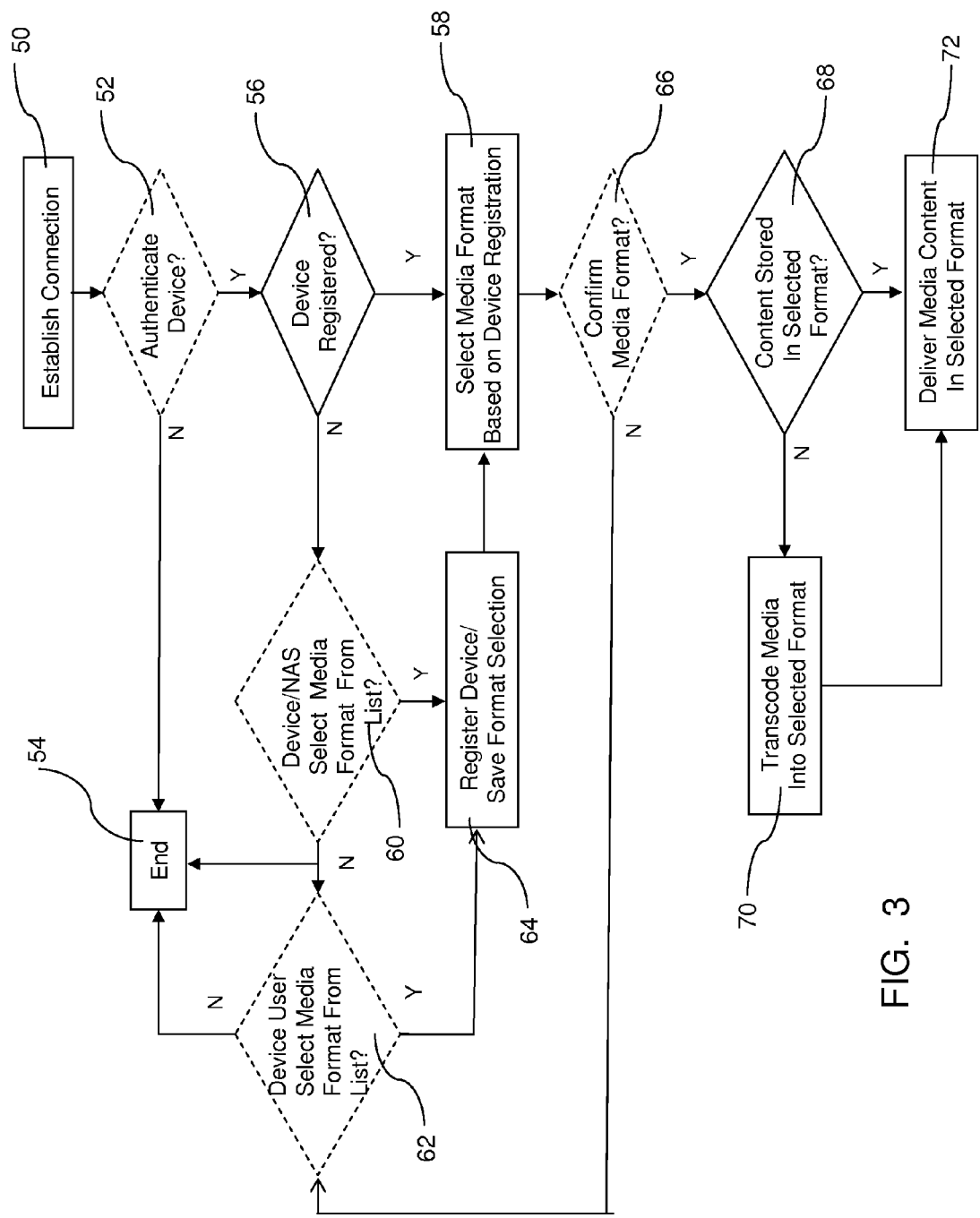
FIG. 3 is a flow chart illustrating a method for selecting and providing media content to a device according to an embodiment of the present invention.

With the above in mind, reference is now made to the flow chart of FIG. 3 wherein operation of an embodiment of the invention is illustrated. In event 50, a connection is established between client device 22-28 and NAS 12 via network 20. Network connection may be established in a conventional manner according to HTTP or other network protocol connection request from client device 22-28. Upon establishing a network connection to NAS 12, client device 22-28 presents a request to NAS 12 for delivery of particular media content in data storage 14 to client device 22-28. The requested media content may be, for example, a song or collection of music, a video selection, a still picture, or the like.

Optionally, in event 52, an authentication determination may be made by device authentication 36 for the client device 22-28 connected in event 52. Many forms of authentication may be used in determining authentication of client device 22-28, including basic access authentication with username and password, digest access authentication, secure remote password protocol (SRP), public key encryption, or Kerberos symmetric key encryption. Prior to processing requests for downloading stored media content, device authentication 36 verifies the credentials of the client device. If client device 22-28 cannot be authenticated, a termination event 54 may occur. If the client device 22-28 is authenticated in event 52, or in embodiments where the optional event 52 is not carried out, event 56 is carried out.

In embodiments where authentication event 52 is carried out, and the device cannot be authenticated, at event 54, the network connection between NAS 12 and the client device 22-28 which could not be authenticated in event 52 may be terminated. A message may be sent to the client device 22-28 for display thereon to the user advising that the client device 22-28 could not be authenticated. The message may invite another attempt at connection and authentication by the client device 22-28.

In event 56, a determination is made by NAS 12 as to whether or not the client device 22-28 that established connection at event 50, (or, optionally, after establishing connection 50 was authenticated in optional event 52, is registered. Device registration 38 looks at stored information to determine if one or more media formats are assigned to or associated with the client device 22-28 or client device type that established connection in event 50 (or, optionally, was authenticated in step 52). If there is a media format assigned to the client device 22-28, the client device 22-28 is considered registered and event 58 may be carried out. If no media format is assigned to the device 22-28 at event 56 the client device 22-28 is considered un-registered and event 60 may optionally be carried out.

In event 58, NAS 12 selects a media format for delivery of media content to client device 22-28 based on information stored by device registration 38. Optionally, event 66 may be carried out after event 58.

In optional event 60, the client device 22-28 can identify itself to the NAS 12, whereby the NAS 12 generates a list of supported formats that the client device 22-28 can select from without user intervention, such as described above with regard to FIG. 2A, events 622-626. Alternatively, the device 22-28 can declare the preferred formats and then the NAS 12 can provide a best match to the preferred formats declared, such as described above with regard to events 623-625 of FIG. 2B. If the client device 22-28 and NAS 12 cannot negotiate a selection at event 60, then termination event 54 may occur. A message may be displayed to the user advising that an appropriate media format could not be selected.

If a selection is not made in event 60, or, in embodiments where event 60 is not an option that is performed, event 62 may optionally be carried out.

In optional event 62, the client device 22-28 is invited to select a format for the media request made in event 50. This invitation may be presented by visual display on client device 22-28 to the user, and the invitation may present a list of media formats that NAS 12 can provide. The list may include, for example, each format that can be provided by CODECs 42 as well as the native or container formats available from data storage 14. If the user of client device 22-28 selects a media format in event 62, event 64 is carried out.

If the user of client device 22-28 cannot or does not select a media format in event 62, or if event 62 is not carried out in the embodiment, termination event 54 may occur.

Event 62 may be carried out as an alternative to event 60, or in instances where no media format selection is made in event 60. The media format selection in event 60 may be based on any type of device recognition or on the most common or popular media formats for the media content requested by client device 22-28.

In event 64, the client device 22-28 is registered by assigning a media format to the device and saving the assigned format, after which event 58 occurs.

In optional event 66, NAS 12 may confirm the media format selection made in event 58 with the user of client device 22-28. Confirmation may be achieved by sending a message by NAS 12 to the user of a client device 22-28 requesting confirmation of the media format determined in event 58. If the selected format is confirmed by the user, event 68 occurs. If the user does not confirm the selected format, processing returns to event 62. Alternatively, in embodiments where event 66 is not carried out, event 68 is carried out after event 58.

In event 68, NAS 12 determines if the media format selected is an existing container format stored in data storage 14. As noted above, certain client devices 22-28 may support and request media content in a container format without the need for transcoding. Event 68 thus determines whether or not transcoding of media content into the selected media format is required. If the selected media format corresponds to an existing container format, event 72 is carried out. If not, the selected media format requires transcoding, and event 70 occurs.

In event 70, stored media content in data storage 14 corresponding to the media content requested by client device 22-28 is transcoded by one of the CODECs 42 into the selected media format for client device 22-28.

In event 72, media content requested by client device 22-28 in event 50 is delivered to the client device in the selected media format.

Figure 4:
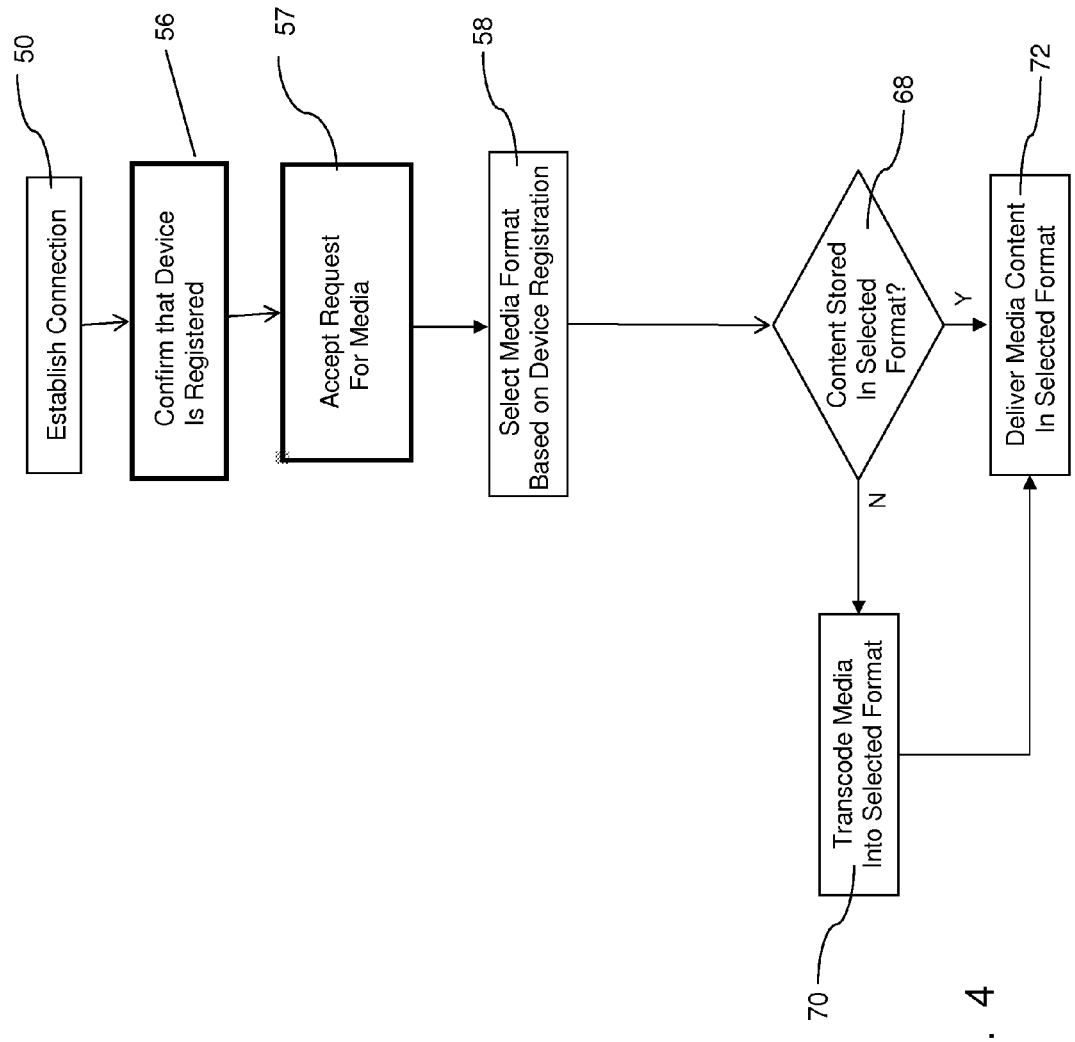
FIG. 4 is a flowchart illustrating an embodiment of the present invention comprising a method that does not require user intervention, wherein the client device has been previously registered.

FIG. 4 is a flowchart illustrating an embodiment of the present invention illustrating a method that does not require user intervention. In event 50, a connection is established between client device 22-28 and NAS 12 via network 20. Network connection may be established in a conventional manner according to HTTP or other network protocol connection request from client device 22-28. Upon establishing a network connection to NAS 12, in event 56 a determination is made by NAS 12 in this instance that the client device 22-28 that established connection at event 50 is registered. Device registration 38 looks at stored information to determine one or more media formats that are assigned to or associated with the client device 22-28 in this instance.

In event 57 NAS 12 accepts a request for delivery of particular media content, the request having been presented from client device 22-28. The requested media content may be, for example, a song or collection of music, a video selection, a still picture, or the like.

In event 58, NAS 12 selects a media format for delivery of media content to client device 22-28 based on information stored by device registration module 38.

In event 68, NAS 12 determines if the media format selected is an existing container format stored in data storage 14. As noted above, certain client devices 22-28 may support and request media content in a container format without the need for transcoding. Event 68 thus determines whether or not transcoding of media content into the selected media format is required. If the selected media format corresponds to an existing container format, event 72 is carried out. If not, the selected media format requires transcoding, and event 70 occurs.

In event 70, stored media content in data storage 14 corresponding to the media content requested by client device 22-28 is transcoded by one of the CODECs 42 into the selected media format for client device 22-28.

In event 72, media content requested by client device 22-28 in event 50 is delivered to the client device in the selected media format.

Figure 5:
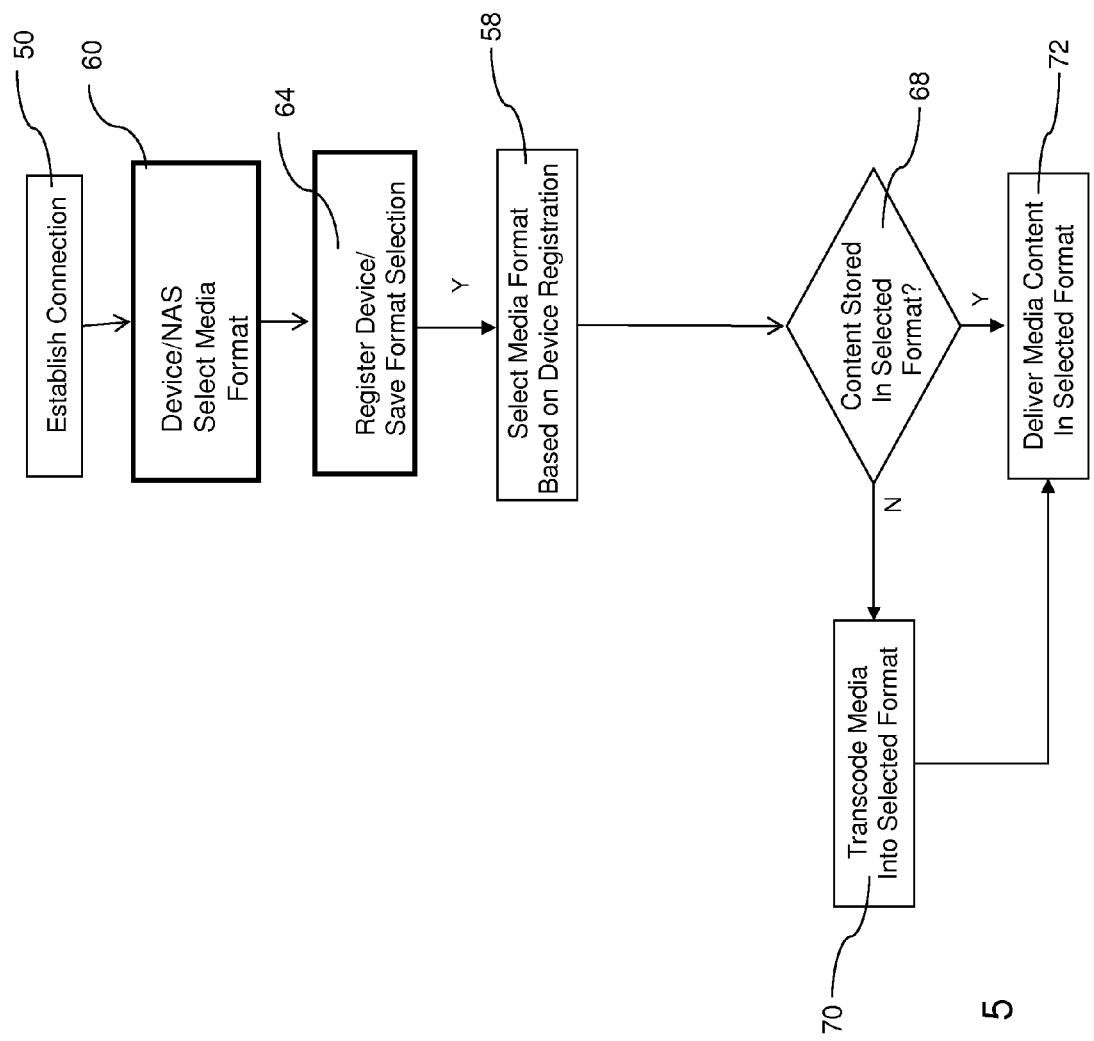
FIG. 5 is a flowchart illustrating an embodiment of the present invention comprising a method wherein the client device has not been previously registered, but that does not require user intervention.

FIG. 5 is a flowchart illustrating an embodiment of the present invention comprising a method wherein the client device has not been previously registered, but that does not require user intervention. In event 50, a connection is established between client device 22-28 and NAS 12 via network 20. Network connection may be established in a conventional manner according to HTTP or other network protocol connection request from client device 22-28. Upon establishing a network connection to NAS 12, client device 22-28 presents a request to NAS 12 for delivery of particular media content in data storage 14 to client device 22-28. The requested media content may be, for example, a song or collection of music, a video selection, a still picture, or the like.

In event 60, the client device 22-28 can identify itself to the NAS 12, whereby the NAS 12 generates a list of supported formats that the client device 22-28 can select from without user intervention, for example in a manner described above with regard to events 622-626 of FIG. 2A. The client device 22-28 selects the best format from the choices available. Alternatively or additionally, the device 22-28 can declare the preferred formats and then the NAS 12 can provide a best match to the preferred formats declared, such as described above with regard to events 623-625 of FIG. 2B.

In event 64, the client device 22-28 is registered by assigning a media format or formats to the device and saving the assigned format(s), after which event 58 occurs.

In event 68, NAS 12 determines if the media format selected is an existing container format stored in data storage 14. As noted above, certain client devices 22-28 may support and request media content in a container format without the need for transcoding. Event 68 thus determines whether or not transcoding of media content into the selected media format is required. If the selected media format corresponds to an existing container format, event 72 is carried out. If not, the selected media format requires transcoding, and event 70 occurs.

In event 70, stored media content in data storage 14 corresponding to the media content requested by client device 22-28 is transcoded by one of the CODECs 42 into the selected media format for client device 22-28.

In event 72, media content requested by client device 22-28 in event 50 is delivered to the client device in the selected media format.

While the present invention has been described with reference to the specific embodiments thereof, it should be understood by those skilled in the art that various changes may be made and equivalents may be substituted without departing from the true spirit and scope of the invention. For example, a client device may include a desktop computer, web-enabled home stereo system, digital video recorder or other device having data storage, processing and network accessing capability such that, when coupled to network 20, the client device may access and download stored media from NAS 12 and/or upload media files to NAS 12. In addition, many modifications may be made to adapt a particular situation, material, composition of matter, process, process step or steps, to the objective spirit and scope of the present invention. All such modifications are intended to be within the scope of the claims appended hereto.

That which is claimed is:

1. A method of communicating between a client device and a network attached storage device (NAS) for accessing and downloading stored media from the NAS to the client device and accessing and uploading media files from the client device to the NAS, the method comprising:
   establishing a connection between the NAS and the client device over a network;
   selecting a media format for the client device, based upon a negotiation involving the client device and the NAS, without user intervention;
   registering the client device associated with the selected media format for use by the NAS, without user intervention;
   saving a registration, by the NAS, of the client device associated with the selected media format; and
   selecting the media format by the NAS;
   wherein the NAS, as a result, is configured to deliver stored media in the selected media format over the connection to the client device, as well as being able to receive media files by the client device uploading media files to the NAS; and
   wherein the NAS utilizes a NAS-oriented operating system.

2. The method of claim 1, further comprising delivering media content to the client device in the selected media format according to a media content request from the client device.

3. The method of claim 2, further comprising confirming the selected media format with a user of the client device, prior to said delivering media content to the client device in the selected media format.

4. The method of claim 1, wherein the negotiation comprises said client device requesting a format supported by said NAS.

5. The method of claim 1, wherein the negotiation comprises:
   said client device identifying itself to said NAS; and
   said NAS providing said selected media format as a media format best matching a media format used by said client device.

6. The method of claim 1, wherein the negotiation comprises:
   said client device identifying preferred media formats to said NAS; and
   said NAS providing said selected media format as a media format best matching one of said preferred media formats.

7. The method of claim 1, wherein the negotiation comprises:
   said NAS generating and making available to said client device a list of supported formats; and said client device selecting said selected media format from said list without user intervention.

8. The method of claim 1, wherein the negotiation comprises registering said client device with said NAS and wherein said selected media format is selected based on information registered during said registering of said client device.

9. The method of claim 1, wherein said negotiation comprises said client device selecting said selected media format from a fixed set of formats listed by said NAS.

10. The method of claim 1, wherein said negotiation comprises said NAS selecting said selected media format from a fixed set of formats listed by said client device.

11. The method of claim 1, further comprising transcoding stored media content into the selected media format.

12. The method of claim 11, wherein said transcoding is performed dynamically, and further comprising streaming transcoded media in the selected media format to the client device in real time while performing said transcoding.

13. The method of claim 11, wherein said transcoding comprises pre-transcoding performed in a background process without requirement of a specific request from a user of said client device.

14. The method of claim 1, further comprising requesting a media format selection from a user of the client device.

15. The method of claim 1, further comprising updating a selected media format according to an identity of the client device.

16. The method of claim 1, further comprising retrieving requested media content from stored media content.

17. The method of claim 1, wherein said selecting a media format and said negotiation comprise selecting a media format by the NAS based on the type of client device making a media content request, and further comprising delivering the media content in the media format selected by the NAS, without further selection by the client device or a user.

18. The method of claim 1, wherein said selecting a media format and said negotiation comprise selecting a media format by the NAS based on the type of media content requested by the client device.

19. The method of claim 1, further comprising authenticating the client device.

20. A network attached storage system comprising:
data storage containing stored media content;
a processor; and
memory containing stored programming, the stored programming configured to be run by said processor to:
establish a connection between a client device and the network attached storage system;
select a media format for the client device, based on a negotiation involving the client device and said network attached storage system;
perform a registration of the client device, without user intervention, in which said media format is assigned to the client device;
save said registration of the client device;
deliver media content to the client device in the selected media format; and
receive media content uploaded from the client device.

21. The network attached storage system of claim 20, further comprising programming configured to be run by said processor to transcode stored media content into the selected media format.

22. The network attached storage system of claim 21, further comprising programming configured to be run by said processor to:
perform the transcoding of said stored media content dynamically; and
stream media content having been transcoded to the client device in real time while performing said transcoding.

23. The network attached storage system of claim 21, further comprising programming configured to be run by said processor to perform the transcoding of said stored media content as a background process for later transfer to the client device.

24. The network attached storage system of claim 21, further comprising programming configured to be run by said processor to perform the transcoding of said stored media by pre-transcoding performed as a background process without requirement of a specific request from a user of the client device.

25. The network attached storage system of claim 20, further comprising programming configured to be run by said processor to confirm the selected media format with a user of the client device, prior to said delivering media content to the client device in the selected media format.

26. The network attached storage system of claim 20, wherein the negotiation comprises said client device requesting a format supported by said network attached storage system.

27. The network attached storage system of claim 20, wherein the negotiation comprises:
the client device identifying itself and preferred media formats to said network attached storage system; and
said network attached storage system providing said selected media format as a media format best matching one of said preferred media formats.

28. The network attached storage system of claim 20, wherein the negotiation comprises:
said network attached storage system generating and making available to the client device a list of supported formats; and
the client device selecting said selected media format from said list without user intervention.

29. The network attached storage system of claim 20, wherein the negotiation comprises registering the client device with said network attached storage system and wherein said selected media format is selected based on information registered during said registering of the client device.

30. The network attached storage system of claim 20, wherein said negotiation comprises the client device selecting said selected media format from a fixed set of media formats listed by said network attached storage system.

31. The network attached storage system of claim 20, wherein said negotiation comprises said network attached storage system selecting said selected media format from a fixed set of media formats listed by the client device.

32. The network attached storage system of claim 20, further comprising programming configured to be run by said processor to request a media format selection from a user of the client device.

33. The network attached storage system of claim 20, further comprising programming configured to be run by said processor to update a selected media format according to an identity of the client device.

34. The network attached storage system of claim 20, further comprising programming configured to be run by said processor to retrieve requested media content from stored media content.

35. The network attached storage system of claim 20, further comprising programming configured to be run by said processor to select a media format based on the type of client device making a media content request.

36. The network attached storage system of claim 20, further comprising programming configured to be run by said processor to select a media format based on the type of media content requested by the client device.

37. A method of providing media to a client device from a network attached storage device (NAS), said method comprising:
- establishing a connection between the NAS and the client device over a network;
- accepting a request for media content by said NAS from said client device;
- said NAS determining if the client device is registered;
- automatically, without user intervention, selecting a media format in which to deliver said media content for said client device, wherein said selecting is performed automatically by selecting the media format assigned in a registration of said client device having been previously performed;
- automatically, without user intervention, selecting a media format for the client device, based upon a negotiation involving the client device and the NAS, when said client device is not registered; and
- delivering said media content in said selected media format to said client device;
- wherein the NAS utilizes a NAS-oriented operating system.

38. The method of claim 37, wherein said automatically selecting comprises negotiating, wherein said NAS negotiates with said device.

39. The method of claim 38, wherein said NAS makes said automatic selection resulting from said negotiating.

40. The method of claim 38, wherein said device makes said automatic selection resulting from said negotiating.

41. The method of claim 40, wherein said negotiating comprises said NAS generating and making available to said device a list of supported formats, and wherein said device selects said selected media format from said list without user intervention.

42. The method of claim 37, further comprising automatically, without user intervention, registering said client device after said selecting a media format for the client device, based upon a negotiation involving the client device and the NAS.

43. A method of receiving a media file from a network attached storage device (NAS), said method comprising:
- establishing a connection with the NAS;
- requesting a media file;
- automatically assigning a selected media format by the NAS, based on information stored during a device registration previously performed, when a device having established the connection is determined to be currently registered;
- negotiating with said NAS, without user intervention, for said selected media format when the device having established the connection is determined to be currently unregistered;
- selecting said selected media format, without user intervention; and
- receiving said media file in said selected media format;
- wherein the NAS utilizes a NAS-oriented operating system.

44. The method of claim 43, wherein said negotiating comprises:
- said NAS generating and making available to said device a list of supported media formats; and
- said device selecting said selected media format from said list without user intervention.

* * * * *